US008452611B1

(12) United States Patent
Johnson et al.

(10) Patent No.: US 8,452,611 B1
(45) Date of Patent: *May 28, 2013

(54) METHOD AND APPARATUS FOR ASSESSING CREDIT FOR HEALTHCARE PATIENTS

(75) Inventors: Steven G. Johnson, Eagan, MN (US); Christopher G. Busch, Golden Valley, MN (US)

(73) Assignee: Search America, Inc., Maple Grove, MN (US)

( * ) Notice: Subject to any disclaimer, the term of this patent is extended or adjusted under 35 U.S.C. 154(b) by 383 days.

This patent is subject to a terminal disclaimer.

(21) Appl. No.: 12/699,789

(22) Filed: Feb. 3, 2010

Related U.S. Application Data

(63) Continuation of application No. 11/218,069, filed on Sep. 1, 2005, now Pat. No. 7,904,306.

(60) Provisional application No. 60/606,306, filed on Sep. 1, 2004.

(51) Int. Cl.
*G06Q 10/00* (2012.01)
*G06Q 50/00* (2012.01)

(52) U.S. Cl.
USPC ..................................... 705/2; 705/3; 705/36

(58) Field of Classification Search
USPC .................................................. 705/2–3, 36
See application file for complete search history.

(56) References Cited

U.S. PATENT DOCUMENTS

| | | | |
|---|---|---|---|
| 4,346,442 A | 8/1982 | Musmanno |
| 4,491,725 A | 1/1985 | Pritchard |
| 4,812,628 A | 3/1989 | Boston et al. |
| 4,872,113 A | 10/1989 | Dinerstein |
| 4,947,028 A | 8/1990 | Gorog |
| 5,239,462 A | 8/1993 | Jones et al. |
| 5,301,105 A | 4/1994 | Cummings, Jr. |
| 5,500,513 A | 3/1996 | Langhans et al. |
| 5,557,514 A | 9/1996 | Seare et al. |
| 5,583,760 A | 12/1996 | Klesse |
| 5,611,052 A | 3/1997 | Dykstra et al. |
| 3,316,395 A | 4/1997 | Lavin |
| 5,644,778 A | 7/1997 | Burks et al. |

(Continued)

FOREIGN PATENT DOCUMENTS

| | | |
|---|---|---|
| WO | WO 94/12943 | 6/1994 |
| WO | WO 95/12857 | 5/1995 |

(Continued)

OTHER PUBLICATIONS

U.S. Appl. No. 12/220,320, filed Jul. 23, 2008, Olof et al.

(Continued)

*Primary Examiner* — Michelle Le
(74) *Attorney, Agent, or Firm* — Knobbe, Martens, Olson & Bear, LLP

(57) ABSTRACT

According to one example embodiment, there is provided a method and an apparatus to evaluate the credit of a healthcare patient. The example embodiment provides methods and computer systems programmed to use multiple variables that are known about a patient prior to a service being rendered to segment the patient population into finer grained groupings. These finer grained groupings allow financial factors, such as a credit score, to be a more accurate predictor. Also, according to another example embodiment, the model is not a generic model for all patients, but the variables and their parameters are specific to a particular healthcare organization's or facility's patient population. This creates a custom model that further enhances its predictiveness.

20 Claims, 3 Drawing Sheets

U.S. PATENT DOCUMENTS

| | | | |
|---|---|---|---|
| 5,699,527 A | 12/1997 | Davidson |
| 5,704,044 A | 12/1997 | Tarter et al. |
| 5,764,923 A | 6/1998 | Tallman et al. |
| 5,832,447 A | 11/1998 | Rieker et al. |
| 5,870,721 A | 2/1999 | Norris |
| 5,878,403 A | 3/1999 | DeFrancesco |
| 5,884,287 A | 3/1999 | Edesess |
| 5,903,830 A | 5/1999 | Joao et al. |
| 5,903,881 A | 5/1999 | Schrader et al. |
| 5,907,828 A | 5/1999 | Meyer et al. |
| 5,926,800 A | 7/1999 | Baronowski et al. |
| 5,930,759 A | 7/1999 | Moore et al. |
| 5,930,776 A | 7/1999 | Dykstra et al. |
| 5,933,809 A | 8/1999 | Hunt et al. |
| 5,940,812 A | 8/1999 | Tengel et al. |
| 5,966,699 A | 10/1999 | Zandi |
| 5,970,478 A | 10/1999 | Walker et al. |
| 5,995,947 A | 11/1999 | Fraser et al. |
| 5,999,596 A | 12/1999 | Walker et al. |
| 6,014,632 A | 1/2000 | Gamble et al. |
| 6,018,723 A | 1/2000 | Siegel et al. |
| 6,021,943 A | 2/2000 | Chastain |
| 6,029,149 A | 2/2000 | Dykstra et al. |
| 6,044,351 A | 3/2000 | Jones |
| 6,044,352 A | 3/2000 | Deavers |
| 6,067,522 A | 5/2000 | Warady et al. |
| 6,073,104 A | 6/2000 | Field |
| 6,088,686 A | 7/2000 | Walker et al. |
| 6,098,052 A | 8/2000 | Kosiba et al. |
| 6,108,641 A | 8/2000 | Kenna et al. |
| 6,128,602 A | 10/2000 | Northington et al. |
| 6,129,273 A | 10/2000 | Shah |
| 6,144,948 A | 11/2000 | Walker et al. |
| 6,163,770 A | 12/2000 | Gamble et al. |
| 6,171,112 B1 | 1/2001 | Clark et al. |
| 6,185,543 B1 | 2/2001 | Galperin et al. |
| 6,202,053 B1 | 3/2001 | Christiansen et al. |
| 6,208,973 B1 | 3/2001 | Boyer et al. |
| 6,233,566 B1 | 5/2001 | Levine et al. |
| 8,001,042 B1 | 8/2001 | Brunzell et al. |
| 6,311,169 B2 | 10/2001 | Duhon |
| 6,327,578 B1 | 12/2001 | Linehan |
| 6,341,265 B1 | 1/2002 | Provost et al. |
| 6,343,271 B1 | 1/2002 | Peterson et al. |
| 6,374,229 B1 | 4/2002 | Lowrey et al. |
| 6,374,230 B1 | 4/2002 | Walker et al. |
| 6,385,594 B1 | 5/2002 | Lebda et al. |
| 6,405,181 B2 | 6/2002 | Lent et al. |
| 6,422,462 B1 | 7/2002 | Cohen |
| 6,453,297 B1 | 9/2002 | Burks et al. |
| 6,456,979 B1 | 9/2002 | Flagg |
| 6,456,983 B1 | 9/2002 | Keyes et al. |
| 6,513,018 B1 | 1/2003 | Culhane |
| 6,587,841 B1 | 7/2003 | DeFrancesco |
| 6,598,030 B1 | 7/2003 | Siegel et al. |
| 6,611,816 B2 | 8/2003 | Lebda et al. |
| 6,684,093 B2 | 1/2004 | Kuth |
| 6,826,535 B2 | 11/2004 | Wood et al. |
| 6,847,942 B1 | 1/2005 | Land et al. |
| 6,901,406 B2 | 5/2005 | Nabe et al. |
| 7,003,491 B2 | 2/2006 | Starkman |
| 7,016,856 B1 | 3/2006 | Wiggins |
| 7,072,842 B2 | 7/2006 | Provost et al. |
| 7,133,840 B1 | 11/2006 | Kenna et al. |
| 7,171,371 B2 | 1/2007 | Goldstein |
| 7,174,302 B2 | 2/2007 | Patricelli et al. |
| 7,181,427 B1 | 2/2007 | DeFrancesco |
| 7,191,150 B1 | 3/2007 | Shao et al. |
| 7,191,451 B2 | 3/2007 | Nakagawa |
| 7,197,468 B1 | 3/2007 | Patricelli et al. |
| 7,246,068 B2 | 7/2007 | Thomas, Jr. |
| 7,249,076 B1 | 7/2007 | Pendleton et al. |
| 7,295,988 B1 | 11/2007 | Reeves |
| 7,298,872 B2 | 11/2007 | Glisson |
| 7,305,359 B2 | 12/2007 | Bonnell |
| 7,328,276 B2 | 2/2008 | Alisuag |
| 7,333,937 B2 | 2/2008 | Baldwin, Jr. et al. |
| 7,346,576 B2 | 3/2008 | Lent et al. |
| 7,379,913 B2 | 5/2008 | Steele et al. |
| 7,380,707 B1 | 6/2008 | Fredman |
| 7,383,215 B1 | 6/2008 | Navarro et al. |
| 7,451,095 B1 | 11/2008 | Bradley et al. |
| 7,505,939 B2 | 3/2009 | Lent et al. |
| 7,527,967 B2 | 5/2009 | Chao et al. |
| 7,556,192 B2 | 7/2009 | Wokaty, Jr. |
| 7,698,153 B2 | 4/2010 | Wiggins |
| 7,711,636 B2 | 5/2010 | Robida et al. |
| 7,747,559 B2 | 6/2010 | Leitner et al. |
| 7,761,379 B2 | 7/2010 | Zoldi et al. |
| 7,765,148 B2 | 7/2010 | German et al. |
| 7,797,172 B2 | 9/2010 | Fitzgerald et al. |
| 7,814,004 B2 | 10/2010 | Haggerty et al. |
| 7,840,484 B2 | 11/2010 | Haggerty et al. |
| 7,860,786 B2 | 12/2010 | Blackburn et al. |
| 7,873,528 B2 | 1/2011 | Bregante et al. |
| 7,885,836 B2 | 2/2011 | Pendleton et al. |
| 7,941,363 B2 | 5/2011 | Tanaka et al. |
| 7,983,932 B2 | 7/2011 | Kane |
| 7,991,689 B1 | 8/2011 | Brunzell et al. |
| 8,036,979 B1 | 10/2011 | Torrez et al. |
| 8,078,524 B2 | 12/2011 | Crawford et al. |
| 2001/0014868 A1 | 8/2001 | Herz et al. |
| 2001/0029482 A1 | 10/2001 | Tealdi et al. |
| 2001/0034618 A1 | 10/2001 | Kessler et al. |
| 2001/0039523 A1 | 11/2001 | Iwamoto |
| 2002/0010594 A1 | 1/2002 | Levine |
| 2002/0072975 A1 | 6/2002 | Steele et al. |
| 2002/0077869 A1 | 6/2002 | Doyle et al. |
| 2002/0077964 A1 | 6/2002 | Brody et al. |
| 2002/0099635 A1 | 7/2002 | Guiragosian |
| 2002/0099641 A1 | 7/2002 | Mills et al. |
| 2002/0103680 A1 | 8/2002 | Newman |
| 2002/0107849 A1 | 8/2002 | Hickey et al. |
| 2002/0133503 A1 | 9/2002 | Amar et al. |
| 2002/0147617 A1 | 10/2002 | Schoenbaum et al. |
| 2002/0147669 A1 | 10/2002 | Taylor et al. |
| 2002/0184054 A1 | 12/2002 | Cox et al. |
| 2002/0188478 A1 | 12/2002 | Breeland et al. |
| 2003/0018549 A1 | 1/2003 | Fei et al. |
| 2003/0028402 A1 | 2/2003 | Ulrich et al. |
| 2003/0036926 A1 | 2/2003 | Starkey et al. |
| 2003/0037054 A1 | 2/2003 | Dutta et al. |
| 2003/0046112 A1 | 3/2003 | Dutta et al. |
| 2003/0046223 A1 | 3/2003 | Crawford et al. |
| 2003/0050795 A1 | 3/2003 | Baldwin, Jr. et al. |
| 2003/0050796 A1 | 3/2003 | Baldwin, Jr. et al. |
| 2003/0078877 A1 | 4/2003 | Beirne et al. |
| 2003/0208412 A1 | 11/2003 | Hillestad et al. |
| 2003/0219709 A1 | 11/2003 | Olenick et al. |
| 2003/0229507 A1 | 12/2003 | Perge |
| 2003/0233259 A1 | 12/2003 | Mistretta et al. |
| 2003/0236747 A1 | 12/2003 | Sager |
| 2004/0006489 A1 | 1/2004 | Bynon |
| 2004/0049473 A1 | 3/2004 | Gower et al. |
| 2004/0054619 A1 | 3/2004 | Watson et al. |
| 2004/0064402 A1 | 4/2004 | Dreyer et al. |
| 2004/0073456 A1 | 4/2004 | Gottlieb et al. |
| 2004/0078228 A1 | 4/2004 | Fitzgerald et al. |
| 2004/0107161 A1 | 6/2004 | Tanaka et al. |
| 2004/0111292 A1 | 6/2004 | Hutchins |
| 2004/0148203 A1 | 7/2004 | Whitaker et al. |
| 2004/0172313 A1 | 9/2004 | Stein et al. |
| 2004/0177030 A1 | 9/2004 | Shoham |
| 2004/0204948 A1 | 10/2004 | Singletary et al. |
| 2004/0215556 A1 | 10/2004 | Merkley, Jr. et al. |
| 2004/0230534 A1 | 11/2004 | McGough |
| 2004/0267660 A1 | 12/2004 | Greenwood et al. |
| 2005/0015280 A1 | 1/2005 | Gabel et al. |
| 2005/0038670 A1 | 2/2005 | Takkar et al. |
| 2005/0065874 A1 | 3/2005 | Lefner et al. |
| 2005/0086071 A1 | 4/2005 | Fox, Jr. et al. |
| 2005/0086072 A1 | 4/2005 | Fox, Jr. et al. |
| 2005/0086579 A1 | 4/2005 | Leitner et al. |
| 2005/0091080 A1 | 4/2005 | Biats, Jr. |
| 2005/0137912 A1 | 6/2005 | Rao et al. |
| 2005/0187860 A1 | 8/2005 | Peterson et al. |
| 2005/0187948 A1 | 8/2005 | Monitzer et al. |

| | | | |
|---|---|---|---|
| 2005/0197954 A1 | 9/2005 | Maitland et al. |
| 2005/0209880 A1 | 9/2005 | Drelicharz et al. |
| 2005/0209922 A1 | 9/2005 | Hofmeister |
| 2005/0228748 A1 | 10/2005 | Togher et al. |
| 2005/0288964 A1 | 12/2005 | Lutzen et al. |
| 2006/0031158 A1 | 2/2006 | Orman |
| 2006/0074991 A1 | 4/2006 | Lussier et al. |
| 2006/0080139 A1 | 4/2006 | Mainzer |
| 2006/0080233 A1 | 4/2006 | Mendelovich et al. |
| 2006/0080251 A1 | 4/2006 | Fried et al. |
| 2006/0100954 A1 | 5/2006 | Schoen |
| 2006/0111940 A1 | 5/2006 | Johnson et al. |
| 2006/0155639 A1 | 7/2006 | Lynch et al. |
| 2006/0173772 A1 | 8/2006 | Hayes et al. |
| 2006/0178971 A1 | 8/2006 | Owen et al. |
| 2006/0178983 A1 | 8/2006 | Nice et al. |
| 2006/0212315 A1 | 9/2006 | Wiggins |
| 2006/0235743 A1 | 10/2006 | Long et al. |
| 2006/0242049 A1 | 10/2006 | Haggerty et al. |
| 2006/0242051 A1 | 10/2006 | Haggerty et al. |
| 2006/0247947 A1 | 11/2006 | Suringa |
| 2006/0282359 A1 | 12/2006 | Nobili et al. |
| 2007/0005402 A1 | 1/2007 | Kennedy et al. |
| 2007/0005403 A1 | 1/2007 | Kennedy et al. |
| 2007/0118410 A1 | 5/2007 | Nadai |
| 2007/0124235 A1 | 5/2007 | Chakraborty et al. |
| 2007/0174122 A1 | 7/2007 | Howard et al. |
| 2007/0198336 A1 | 8/2007 | Thompson |
| 2007/0198407 A1 | 8/2007 | Winter |
| 2007/0214005 A1 | 9/2007 | Kennedy |
| 2007/0258626 A1 | 11/2007 | Reiner |
| 2007/0279187 A1 | 12/2007 | Hekmatpour et al. |
| 2007/0294126 A1 | 12/2007 | Maggio |
| 2007/0299699 A1 | 12/2007 | Policelli et al. |
| 2008/0010096 A1 | 1/2008 | Patterson et al. |
| 2008/0015979 A1 | 1/2008 | Bentley |
| 2008/0059224 A1 | 3/2008 | Schechter |
| 2008/0059317 A1 | 3/2008 | Chandran et al. |
| 2008/0065569 A1 | 3/2008 | Dutt et al. |
| 2008/0086400 A1 | 4/2008 | Ardelean et al. |
| 2008/0091592 A1 | 4/2008 | Blackburn et al. |
| 2008/0109315 A1 | 5/2008 | Huang et al. |
| 2008/0120133 A1 | 5/2008 | Krishnaswami et al. |
| 2008/0133325 A1 | 6/2008 | De et al. |
| 2008/0183504 A1 | 7/2008 | Highley |
| 2008/0189202 A1 | 8/2008 | Zadoorian et al. |
| 2008/0270294 A1 | 10/2008 | Lent et al. |
| 2008/0270295 A1 | 10/2008 | Lent et al. |
| 2008/0288283 A1 | 11/2008 | Baldwin, Jr. et al. |
| 2008/0294540 A1 | 11/2008 | Celka et al. |
| 2009/0044279 A1 | 2/2009 | Crawford et al. |
| 2009/0048877 A1 | 2/2009 | Binns et al. |
| 2009/0094055 A1 | 4/2009 | Gage, Jr. et al. |
| 2009/0157435 A1 | 6/2009 | Seib |
| 2009/0177480 A1 | 7/2009 | Chen et al. |
| 2009/0222308 A1 | 9/2009 | Zoldi et al. |
| 2009/0276244 A1 | 11/2009 | Baldwin, Jr. et al. |
| 2009/0281827 A1 | 11/2009 | Pendleton et al. |
| 2010/0063907 A1 | 3/2010 | Savani et al. |
| 2010/0142698 A1 | 6/2010 | Spottiswoode et al. |
| 2010/0332381 A1 | 12/2010 | Celka et al. |
| 2011/0010189 A1 | 1/2011 | Dean et al. |
| 2012/0116950 A1 | 5/2012 | Torrez et al. |
| 2012/0158574 A1 | 6/2012 | Brunzell et al. |

FOREIGN PATENT DOCUMENTS

| | | |
|---|---|---|
| WO | WO 99/46710 | 9/1999 |
| WO | WO 01/04821 | 1/2001 |
| WO | WO 01/41355 | 6/2001 |
| WO | WO 02/13047 | 2/2002 |
| WO | WO 2004/114160 | 12/2004 |
| WO | WO 2008/021061 A2 | 2/2008 |

OTHER PUBLICATIONS

"ACS Company Birch & Davis Wins Texas CHIP Contract," PR Newswire, Section: Financial News, 3 pgs., Dallas, TX, May 17, 2000.

"An even better solution to financing elective surgery . . . ," Unicorn Financial, 7 pgs., as downloaded from http://web.archive.org/web/20000816161359/http://www.unicornfinancial.com/ [Oct. 15, 2008 3:45:25 PM].

"Authorizing Safety Net Public Health Programs," Hearing before the Subcommittee on Health of the Committee on Energy and Commerce, House of Respresentatives, One Hundred Seventh Congress, First Session, Serial No. 107-57, dated Aug. 1, 2001, 226 pgs., available at http:///www.access.gpo.gov/congress/house.

"Birch & Davis Wins Texas CHIP Contract," Birch & Davis Press Release, dated Jan. 4, 2000, 3 pgs., as downloaded from http://web.archive.org/web/20010304065515/www.birchdavis.com/txchip.htm (1 of 3) [Oct. 20, 2008 9:49:18 AM].

"Financing Medical Procedures A Lucrative But Risky Business," Credit Risk Management Report, vol. 10, Issue 15, 2 pgs., dated Aug. 7, 2000.

"Improving the Implementation of State Children's Health Insurance Programs for Adolescents Report of an Invitational Conference Sponsored by the American Academy of Pediatrics, Section on Adolescent Health," Pediatrics, Official Journal of the American Academy of Pediatrics, Invitational Conference Planning Committee and Particpating Organizations/Agencies, held Sep. 26-27, 1999, available at http://www.pediatrics.org/cgi/content/full/105/4/906.

"MediCredit Announces Major Investment from Medstone; Financing Will Enable Dramatic Expansion of Online Services," Business Wire, 2 pgs, dated May 12, 2000.

"Web Site Fuels Elective Surgery Trend; The Complete Resource to Paying for Cosmetic Surgery, Laser Vision Correction and Cosmetic Dentistry," Business Wire, 2 pgs, dated Apr. 7, 1999.

An Expert System for Determining Medicaid Eligibility, Journal of Medical Systems, vol. 12, Nov. 5, 1988, in 10 pages.

BadgerCare, Division of Health Care Financing.

Barry, Ellen, "Life, Liberty, and the Pursuit of Lipo," The Boston Phoenix, News & Opinion, dated Apr. 6, 1998, as downloaded at http://weeklywire.com/ww/04-06-98/boston_feature_1.html (1 of 12) [Oct. 15, 2008 2:35:25 PM].

Belford, Terrence, "Technology Quarterly: Computers Internet speeds credit checks System tailored for doctors, dentists," The Globe and Mail (Canada), Section: Report on Business Special Reports, dated Mar. 18, 1997, 2 pgs.

Boss, Shira J. "Elective Surgery Without the Plastic: Low-Interest Medical Financing Provides Alternative to Credit Cards," factiva, Crain's New York Business, 2 pgs., dated Jun. 22, 1998.

Broward County CAP Grant Application, 41 pgs.

Burr Ph.D., Sara et al., "Utility Payments as Alternative Credit Data: A Reality Check", Asset Builders of America, Inc.

Calnan, Christopher, "Tenet, Fair Isaac invest $20M in startup," MHT, Mass High Tech: The Journal of New England Technology, dated Jul. 23, 2007, 2 pgs.

Capps, Randy et al., "Recent Changes in Texas Welfare and Work, Child Care and Child Welfare Systems," Assessing the New Federalism, The Urbane Institute, State Update No. 1, 24 pgs., Jun. 2001.

CAPStone Newsletter, Sep. 2001, 8 pgs., as downloaded from http://web.archive.org/web/20011213115738/www.capcommunity.hrsa.gov/Newsletter/Newsletter12.htm (1 of 8) [Oct. 18, 2008 2:39:47 PM].

Card Marketing, Use the Latest CRM Tools and Techniques, www.CardForum.com, vol. 5 No. 10, Dec. 2001.

Cheney, Karen, "Fix Your Nose, If You Wish, But Not With This New Loan," Money Magazine, vol. 27, No. 5, 1 pg., dated May 1, 1998.

Custom Strategist and Qualifile.

DentalFinancing.com, "Financial services for patients and dental professionals,", 7 pgs., as downloaded from http://web.archive.org/web/20010607151954/www.dentalfinancing.com/dentist/index.asp (1 of 2) ]Oct. 15, 2008 3:55:16 PM].

Dietz, Ellen, "Dental Office Management," 8 pgs., pp. 316-321, Copyright 2000.

eFunds Introduces Qualifile.

Electronic Privacy Information Center, "The Fair Credit Reporting Act" 15 USC 1681 (1992), 10 pgs., as downloaded from http://epic.org/privacy/financial/fcra.html on Mar. 19, 2008.

Ellwood, Marilyn, "The Medicaid Eligibility Maze: Coverage Expands, but Enrollment Problems Persist, Findings from a Five-State Study," Mathematica Policy Research, Inc., Occasional Paper No. 30, 56 pgs., Dec. 1999.
Felsenthal, Edward, "Health Costs; Managed Care Helps Curb Costs, Study Says," The Wall Street Journal, dated Aug. 12, 1991.
Gilje, Shelby, "Credit Agency Moving Into Health Care," NewsRoom, Seattle Times, WA, Section: Scene, Dated Mar. 22, 1995, 3 pgs., as downloaded from http://web2.westlaw.com/result/documenttext.aspx?rs=WLW8.03&ss+CNT&rp=%2fWelc . . . on Mar. 19, 2008.
Goldstein, Jacob, "The Newest Vital Sign: Your Credit Score," The Wall Street Journal, Health Blog, as viewed at http://blogs.wsj.com/health/2008/03/18/the-newest-vital-sign-your-cr . . . , 3 pgs.
Henry, M.D., Kimberly A., "The Face-Lift Sourcebook," copyright 2000, 3 pgs. (p. 207).
IndiCareTM, On-Line Patient Assistant Program, Website Users Manual.
Kent, Heather, "Huge declines in price as competition heats up in Vancouver's booming laser-surgery market," CMAJ, Oct. 5, 1999; 161 (7), pp. 857-858.
Lavelle, Marianne, "Health Plan Debate Turning to Privacy Some Call for Safeguards on Medical Disclosure. Is a Federal Law Necessary?," The National Law Journal, vol. 16, No. 39, dated May 30, 1994, as downloaded from http://web2.westlaw.com/result/documenttext.aspx?rs=WLW8.038&ss=CNT&rp=%2fWelc . . . on Mar. 19, 2008.
Mathematica Policy Research, Inc., "1998 Health Care Survey of DoD Beneficiaries: Technical Manual," Jul. 1999.
McGovern, Celeste, Jayhawk Medical Acceptance. (Brief Article), Alberta Report, 1 pg., dated Aug. 23, 1999.
McLaughlin, Nancy H., NewsRoom, Greensboro News & Record (NC), Section: General News, "Homeless, Pregnant and Alone Dana Sides Knows Her Baby Is Likely to Come in a Month, But She Has No Idea Where She Will Go After Leaving the Hospital," dated Dec. 6, 2001.
MediCredit, Patient Financing, "Thought you couldn't afford Cosmetic Surgery?," 3 pgs., as downloaded from http://web.archive.org/web/19970601060333/http://www.medicredit.com/ (1 of 2) [Oct. 15, 2008 3:16:31 PM].
NewsRoom, Insurance Regulator, State Survey, "CIGNA Report Withdrawn As Foe Sees Opening," Sep. 9, 1996, vol. 8, Issue 34, 4pgs, as downloaded at http://web2.westlaw.com/result/documenttext.aspx?rs=WLW8.03&ss=CNT&rp=%2fWelc . . . on Mar. 19, 2008.
Pennsylvania Law Weekly, "Discriminating Against Victims Admitting Domestic Abuse Can Lead to Denial of Insurance Coverage," vol. XVIII, No. 26, dated Jun. 26, 1996, 2 pgs., as downloaded from http://web2.westlaw.com/result/documenttext.aspx?rs=WLW8.03&ss=CNT&rp=%2fWelc . . . on Mar. 19, 2008.
Rubin, Rita, "Cosmetic Surgery on Credit Finance plans let patients reconstruct now, pay later," The Dallas Morning News, 2 pgs., dated Sep. 10, 1988.
SearchAmerica, Solutions, "Payment Advisor Suite TM" 2008.
Selz, Michael, "Lenders Find Niche in Cosmetic Surgery That Isn't Insured—But Since You Can't Repossess a Nose Job, Risks Aren't Restricted to the Patients," Wall Street Journal, New York, N.Y., Jan. 1997, p. A.1, 3 pgs., as downloaded from http://proquest.umi.com.libproxy.mit.edu/pqdweb?index=0&sid=1srchmode=1&vinst= . . . Oct. 14, 2008.
Stein, Benchmarking Default Prediction Models: Pitfalls and Remedies in Model Validation, Moody's KMV, Revised Jun. 13, 2002, Technical Report #020305; New York.
Texas Department of Human Services, 1999 Annual Report, 60 Years of Progress, Medial Services 9P137, Publication No. DHS-600-FY99.
thatlook.com, Cosmetic Surgery Financing, 3 pgs, as downloaded from http://web.archive.org/web/200001214113900/www.thatlook.com/cosmetic_surger_financing.cfm (1 of 2) [Oct. 15, 2008 4:11:47 PM].
Thomas, David, "Report on Networks and Electronic Communications Newcourt Credit turns to extranet Services / A PC connects to 1,200 users at once." The Globe and Mail (Canada), Section: Report on Business Special Report, 2 pgs., dated Nov. 12, 1996.
Washington State Office of Public Defense, "Criteria and Standards for Determining and Verifying Indigency," dated Feb. 9, 2001.
Webpage printed from <http://www.magnum.net/pdfs/RapUpBrochure.pdf.> On Mar. 4, 2008.
Window on State Government, Susan Combs, Texas Comptroller of Public Accounts, Chapter 8: Health and Human Services, "Improve the Medicaid Eligibility Determination Process," 9 pgs., as downloaded at http://www.window.state.tx.us/etexas2001/recommend/ch08/hhs08.html on Apr. 9, 2008.
Wisconsin Department of Workforce Development, BadgerCare Medicaid Application Credit Report Authorization Form, dated Jun. 21, 2001.
Wisconsin Department of Workforce Development, BadgerCare Medicaid Notification of Eligibility, dated Jul. 25, 2000.
Zoot's Decision Engine, www.zootweb.com/decision_engine.html.
Zoot's Instant Rules GUI, www.zootweb.com/instant_rules_GUI.html.
Zoot's Pre-Built Standard Attributes, www.zootweb.com/credit_attributes.html.
Zoot's Rules Management GUI, www.zootweb.com/business_rules_GUI.html.
*Transunion Intelligence LLC* v. *SearchAmerica, Inc.*, Prior Art Statement, Non-Confidential Redacted Version, Case No. 0:11-CV-01075-EJS-FLN, Nov. 16, 2012.
Butkus, Charles, "System Cuts Medicaid Processing to 11 Cents a Claim", ConnputerWorld, May 21, 1975, pp. 51 and 53.
"Charity Care Policy and Procedure", Report to the Community for the Year 2002, John T. Mather Mermorial Hospital, Port Jefferson, NY, 2002.
Compliance Data Systems, Inc. T-PASS Catalogue Profile, Sep. 8, 1994, available at http://www.compliancedata.com/catalogue.html.
"Current System Architecture and Functional Specifications", TDHS System, Jul. 3, 2000.
"Enterprise Technology Management Architecture", Texas Department of Human Services, Version 1.0, Aug. 31, 1999, pp. 22.
"Factual Data Corp. Completes First Interface with Automated Underwriting System for Subprime Lenders", PR Newswire, Loveland, CO, Jan. 17, 2000.
Frohlich, Robert M., Jr., "Credit Scoring in a Hospital Setting", University of North Florida Thesis, Paper 97, Apr. 1997, pp. 82.
"HelpWorks Family of Products Offers Solutions for Providers of Social Services", Software Announcement, Letter No. 297-476, Nov. 11, 1997, http://www.www-304.ibm.com/jct01003c/cgi-bin/common/ssi/ssialias?infotype=an&subtype=ca&htmlfid=897/ENUS297-476&appname=x1data&language=enus.
"HelpWorks: One-Stop Screening for the Benefits Your Clients Need", Peter Martin Associates, Inc. website, HelpWorks description, Jul. 11, 2000, http://web.archive.org/web/20000711013829/http://www.petermartin.com/Products/HelpWorks/hw_info02.html.
"Implementation Advance Planning Document", Implementation Advance Planning Document, TIERS, Texas Department of Human Services, Eric M. Bost, Commissioner, May 2000, pp. 128.
Income and Eligibility Verification System (IEVS), Medi-Cal Eligibility Procedures Manual, Apr. 2000, pp. 164.
Jones, Sandra, "Small Software Firm Aiming for Internet", ChicagoBusiness.com, Mar. 13, 2000.
Mowll, Charles, "Setting a Credit Policy for Patient Accounts", Healthcare Financial Management, Jan. 1989, pp. 3.
Mowll, Charles, "Knowing How and When to Grant Credit Healthcare Organizations", Healthcare Financial Management, Feb. 1989, pp. 4.
Network Sciences Website, Community Health and Social Services Information System (CHASSIS) and Medicaider software by Network Sciences, LLC, on sale and/or in public use in or around 2000, http://www.netsci.net/index.asp.
*Newsom* v. *Vanderbilt University et al.*, Opinion, 453 F.Supp. 401 (1978), Jun. 1, 1978, pp. 24.
"Patients May be Frauds", The Victoria Advocate, Victoria, Texas, 138th Year—No. 194, p. 10A, Nov. 17, 1983.

"Peter Martin Releases HelpWorks Web Edition", Business Wire, Chicago, Sep. 28, 1999.

"Response Automated Decision Systems", responsecorp.com, Inc., Press Release, Ft. Lauderdale, FL, Jun. 22, 2000, http://web.archive.org/web/20010420061717/http://www.responsecorp.com/news.html.

Sear, Alan M., Ph.D., "An Expert System for Determining Medicaid Eligibility", Journal of Medical Systems, Oct. 1988, vol. 12, Issue 5, pp. 275-283.

"StarNet Financial, Inc. Acquires Proprietary Rights to Sub-Prime Underwriting System Through Strategic Alliance With TRAkkER Corporation", PR Newswire, Dallas, TX, Sep. 13, 1999.

Technical Architecture Framework, TIERS, May 8, 2000, pp. 67.

Texas Comptroller of Public Accounts, Texas Performance Review, "Against the Grain: vol. 2," 1993, as printed Dec. 14, 2012 in 7 pages, from http://www.window.texas.gov/tpr/atg/atg/atgtoc.html.

Texas Comptroller of Public Accounts, Texas Performance Review, "Gaining Ground: vol. 2," 1994, as printed Dec. 14, 2012 in 4 pages, from http://www.window.texas.gov/tpr/tprgg/v2home.html.

"Third Party Assistance Software System (T-PASS)", Compliance Data Systems, Inc. website, T-PASS Information Page, Oct. 1, 1998, available at http://web.archive.org/web/20010308232545/http://compliancedata.com/tpass.html#Profile.

TRAkkER Corporation website, trakkercorp.com, TRAkkER Software Description, May 26, 2000, available at http://web.archive.org/web/20000526234204/http://trakkercorp.com/page4.html.

*Transunion Intelligence LLC* v. *Search America, Inc.*, Videotape Deposition of Jodi Halpine, Oct. 16, 2012, Case No. 0:11-CV-01075-EJS-FLN, pp. 176.

*United States of America* v. *Patricia Lahaie Mahaney*, Government's Response to the Standing Discovery Order, Case:0:03-cr-60022-JIC, Entered into docket Jun. 17, 2003, pp. 16.

Washington Automated Client Eligibility System (ACES), 1996, pp. 13.

METHOD AND APPARATUS FOR ASSESSING CREDIT FOR HEALTHCARE PATIENTS

This application is a continuation of U.S. patent application Ser. No. 11/218,069, filed Sep. 1, 2005, which claims priority to U.S. Provisional Application No. 60/606,306 filed Sep. 1, 2004, which are both incorporated herein by reference.

FIELD

The present subject matter relates to healthcare patient credit, and more particularly to methods and apparatuses to assess credit of healthcare patients.

BACKGROUND

Healthcare entities would like to know which patients are likely to pay their bills (patient financial responsibility) and which are not likely to pay. Those deemed not able to pay will receive the same treatment as other patients, but the earlier their need is identified the sooner that the healthcare facility can get the patient into financial counseling or enrolled in an appropriate Medicaid, charity care or grant program. Also, if a patient is not likely to pay and they are not eligible for charity programs, then a healthcare facility can choose to expend fewer resources trying to collect and therefore save money.

There have been attempts to predict a patient's ability to pay using conventional "generic" credit scores, but these have met limited success. This is because each healthcare facility's patient population differs from others and a generic credit score model is insufficient to accurately predict the outcomes. A generic credit score is often too general a predictor since it treats all patient segments the same.

DETAILED DESCRIPTION

Figure 1:
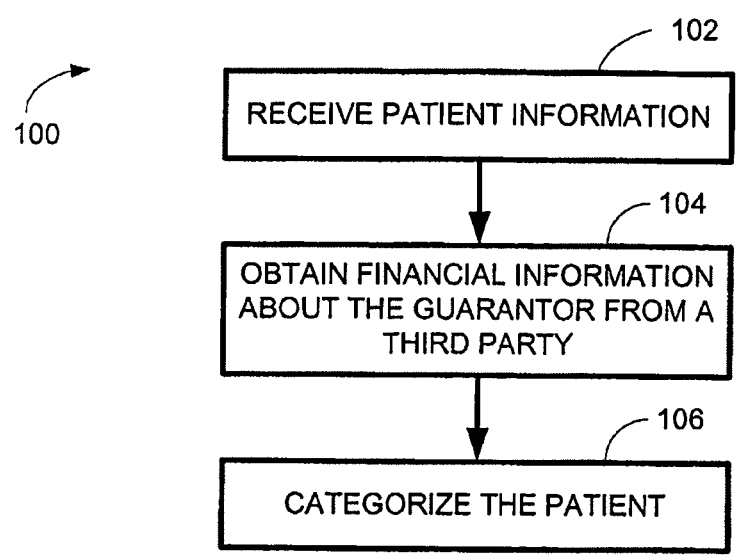
FIG. 1 illustrates a method according to an example embodiment.

In the following detailed description, reference is made to the accompanying drawings that form a part hereof, and in which is shown by way of illustration specific embodiments in which the subject matter can be practiced. These embodiments are described in sufficient detail to enable those skilled in the art to practice them, and it is to be understood that other embodiments can be utilized and that structural, logical, and electrical changes can be made without departing from the scope of the inventive subject matter. Such embodiments of the inventive subject matter can be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software, or a combination of software and hardware in one embodiment. The software comprises computer executable instructions stored on computer readable media such as memory or other type of storage devices. The term "computer readable media" is also used to represent electromagnetic carrier waves on which the software is transmitted. Further, such functions correspond to modules, which are software, hardware, firmware, or any combination thereof. Multiple functions are performed in one or more modules as desired, and the embodiments described are merely examples. The software is executed on a digital signal processor, an application specific integrated circuit ("ASIC"), a microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an ASIC. Thus, the exemplary process flow is applicable to software, firmware, and hardware implementations.

According to one example embodiment, there is provided a method and an apparatus to evaluate the credit of a healthcare patient. The example embodiment provides methods and computer systems programmed to use multiple variables that are known about a patient prior to a service being rendered to segment the patient population into finer grained groupings. These finer grained groupings allow financial factors, such as a credit score, to be a more accurate predictor of payment. Also, according to another example embodiment, the model is not a generic model for all patients, but the variables and their parameters are specific to a particular healthcare organization's or facility's patient population. This creates a custom model that further enhances its predictiveness.

In the example embodiment, illustrated in FIG. 1, the method 100 or programmed computing system receives information about a patient 102. The attributes can include anything that is known about the patient prior to a service being rendered. This could include patient type (i.e. inpatient, outpatient, emergency room, etc) and patient financial class (i.e. Medicare, Medicaid, commercial payer, self pay, etc), age, amount owed, marital status, etc. These variables are used to segment the patient population. These variables are also used to determine whether additional financial information from a credit bureau would increase the accuracy of the prediction of payment. Since there is a cost associated with obtaining the additional information, the benefit of the increase in predictiveness is weighed against the increased cost, and a decision is made whether to obtain the additional information.

If additional benefit is deemed positive, the financial information about the guarantor or patient is then obtained from a third party 104 or a credit bureau or similar source, for example by downloading it into the computing system determining the credit rating for the patient over a network. Such a network can include a proprietary network, a world wide network such as the Internet, or other network over which such information can be obtained. The quality and effectiveness of a data source (credit bureau) varies by geographic region. Which data source to use is determined by an algorithm called the "Bureau Selector" (see Bureau Selector section below). The information obtained can include demographic information, credit score, payment history, credit balances, mortgage status, bankruptcy, income estimates, etc. This information is used within each of the patient segments to categorize the patient 106. According to one example embodiment, the Category is a user definable grouping of patients based on likelihood of payment. For example, the categories might be "Low" probability of payment, "Medium" and "High". Those in the low category might be further segregated into those unable to pay, those eligible for Medicaid, those eligible for charity care, etc. Each category has an associated confidence level or probability associated with it. For example, a healthcare facility might want the low category to have a 90% probability for not paying and the high category to have a 90% probability for paying.

Figure 2:
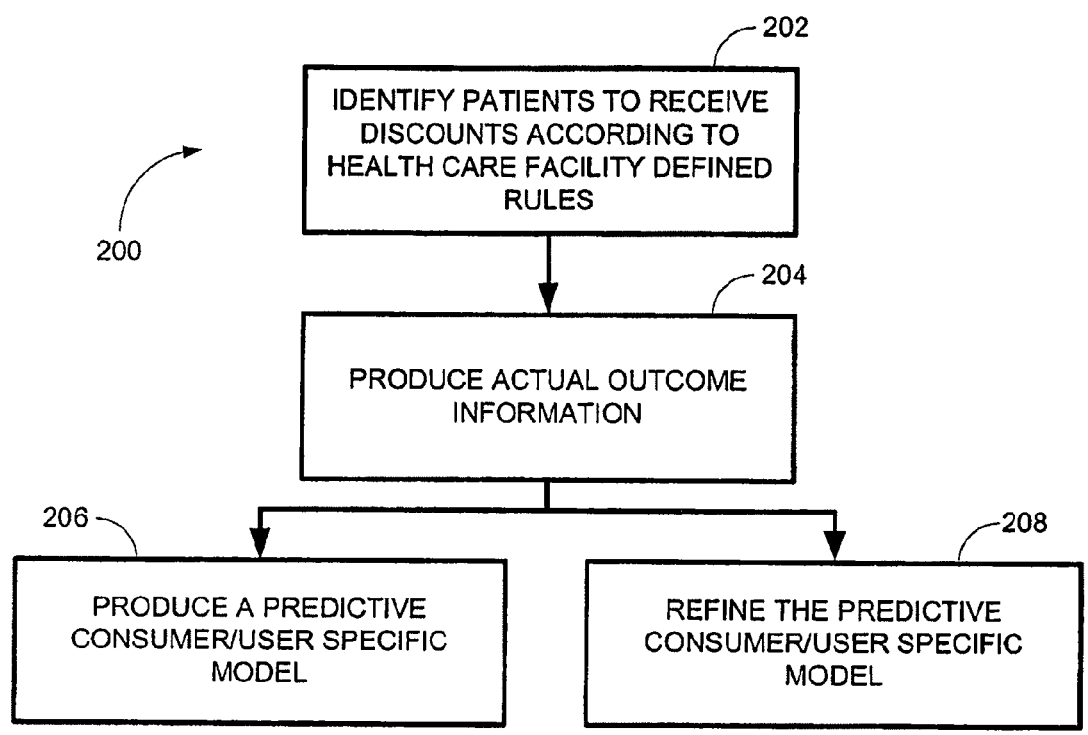
FIG. 2 illustrates a method according to an example embodiment.

Those unable to pay can, in some embodiments, also be offered a discount by the healthcare facility. These "Discounts for the Uninsured" can, or indeed in some cases must, be applied in a consistent manner across the patient population. According to one example embodiment, illustrated in FIG. 2, the method 200 and computing system identifies these patients and uses healthcare facility defined rules to determine which patients are entitled to discounts 202. For example, the healthcare facility can decide that those patients with household size of 4 whose incomes are twice the Federal Poverty Guidelines Limit (FPGL) are entitled to a 75% discount and those that are at the FPGL are entitled to a 100% discount. According to another example embodiment, the method and computing system uses an estimate of a patient's income based credit attributes and an estimate of household size based on marketing/demographic data to determine discount eligibility.

In some example embodiments, periodically a healthcare organization using the credit assessment method and system will produce actual outcomes information 204 that can be used to refine the model. The outcomes information will consist of whether the patient paid their bill, how long it took to pay, how their bill was paid, etc. The model can therefore be adjusted to more accurately predict payment based on actual experience on a periodic basis or from time to time.

These categories, probabilities, patient segmenting variables, and financial information are combined with actual outcomes data to produce a highly predictive customer/user specific model 206. This outcomes feedback process is continued on a periodic basis (i.e. monthly) or at any other desired non-periodic interval in order to continue to refine the model for a particular patient population. This is also important since small or large changes in a healthcare facility's workflow can impact the outcomes (i.e. if a healthcare facility is more aggressive in collecting co-pays during registration, more will be collected causing the financial information thresholds to need to be adjusted). These changes can be accounted for in the model by continually feeding outcomes information back 208.

BUREAU SELECTOR

Figure 3:
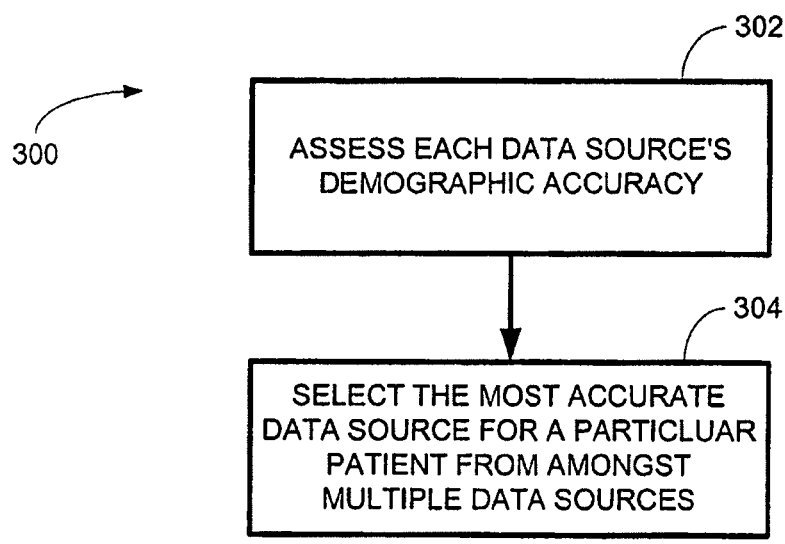
FIG. 3 illustrates a method according to an example embodiment.

According to another embodiment, illustrated in FIG. 3, a method 300 and computing systems provide for improving the accuracy of credit assessment or rating results by selecting the most accurate data source from amongst multiple data sources 304 (called the "Bureau Selector"). Each data source (e.g. credit bureau or other source of credit data) has regional strengths and weaknesses, especially in the accuracy of demographic information. According to one example embodiment, the most accurate demographic information can be obtained from the most accurate data source in a region. Accordingly, methods 300 and computing systems assess a data source's demographic accuracy 302.

The type of information that is gathered by a credit bureau is protected by multiple laws (GLB and FCRA). The information can only be used for a "permissible purpose" under the law, which includes things like collections and account review. It is not typically permissible to randomly select credit files and call people to see if the information is accurate. Instead, the accuracy must be measured as a by-product of a permissible transaction. For example, in the course of pursuing collections with an account, information in the credit report can be validated.

According to one example embodiment, the accuracy of a bureau's data is assessed 302 by using the outcomes information that is recorded by a customer/user of the credit assessment method and system. For example, Healthcare facility A is a customer/user. They use credit report information from different credit bureaus (via the above described method and system) for a permissible purpose (collections). According to one example embodiment, if an account is paid, either partially or in full, then the demographic information can be deemed to be valid because the healthcare facility was able to contact the patient either via the address or phone. If the healthcare facility receives returned mail, then the demographic information can be deemed not valid since the address did not work.

According to another example embodiment the method 300 and system assesses each data source 302 in each geographic region by looking at the first 3 digits of a patient's zip code (called an SCF). Each zip code SCF can be seeded with an initial bureau ordering (presumed strengths gleaned from external sources or the data sources themselves). As each transaction occurs and the method and system receives outcomes information, points for or against a bureau are awarded based on whether a data sources data resulted in a patient paying their bill. In this way, the ordering of data sources in a particular geography (SCF) can continually be adjusted.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this inventive subject matter can be made without departing from the principles and scope of the inventive subject matter as expressed in the subjoined claims.

What is claimed is:
1. A computerized method comprising:
obtaining initial patient information associated with one or more of a patient and a guarantor of costs, the costs associated with providing healthcare services to the patient;
determining a benefit of obtaining additional information including financial information related to the guarantor
weighing the benefit of obtaining the additional information against the cost of obtaining the additional information; and
determining whether to obtain the additional information at least in part based on the weighing, wherein the method is performed by a computing system comprising one or more computing devices.

2. The computerized method of claim 1, further comprising segmenting a patient population which includes the patient into categories at least in part based on one or more of the initial information or the additional information.

3. The computerized method of claim 2, further comprising segmenting the patient population into sub-categories at least in part based on one or more of the initial information or the additional guarantor financial information.

4. The computerized method of claim 2, further comprising assessing a service price for providing the healthcare services to the patient according to the determined patient category.

5. The computerized method of claim 1, wherein the initial information includes patient type, patient financial class, age, amount owed, and marital status.

6. The computerized method of claim 1, wherein the guarantor is other than the patient.

7. The computerized method of claim 1, wherein the additional information comprises a credit report of the guarantor obtained from a third party credit bureau.

8. The computerized method of claim 7, wherein the third-party source of guarantor financial information is selected from a group of third-party sources as a function of actual performance data.

9. A method comprising:
   determining a probability that patient healthcare service charges will be paid as a function of one or more of patient information and guarantor financial information, wherein the probability is determined as a function of a payment probability model;
   refining the payment probability model as a function of information including the determined probability and one or more of the patient information, the guarantor financial information, an indication of the source of the financial information, and received patient payment history associated with charges for the patient healthcare services, wherein the method is performed by a computing system comprising one or more computing devices.

10. The method of claim 9, wherein refining the payment probability model includes changing the source of financial information to determine the payment probability.

11. The method of claim 9, wherein the source of financial information is a credit bureau.

12. A method of selecting a source of financial information, the method comprising:
   receiving first information related to one or more of a patient or a guarantor of costs associated with providing healthcare services to the patient;
   receiving actual performance data of guarantor collection activity; and
   selecting a source of financial information as a function of one or more of at least some of the first information and at least some of the actual performance data, wherein the method is performed by a computing system comprising one or more computing devices.

13. The method of selecting a source of financial information of claim 12, wherein at least some of the sources of financial information comprise respective credit bureaus.

14. The method of selecting a source of financial information of claim 12, wherein the actual performance data comprises one or more of data related to whether an attempt to contact a guarantor is successful or data related to whether payment is received on a guarantor account.

15. The method of selecting a source of financial information of claim 12, wherein the at least some of the first information comprises at least a portion of a guarantor zip code.

16. The method of selecting a source of financial information of claim 12, wherein the selecting comprises selecting a source of financial information based on at least the at least some of the first information and the at least some of the actual performance data.

17. The method of selecting a source of financial information of claim 12, wherein the at least some of the information includes geographic information related to the residence of one or more of the patient and the guarantor.

18. The method of selecting a source of financial information of claim 17, wherein the selecting is based at least in part on strengths of the sources of financial information in a region including the residence of one or more of the patient or the guarantor.

19. The method of selecting a source of financial information of claim 18, wherein the selecting comprises:
   performing an initial ordering of the set of available sources of financial information based on the strengths; and
   adjusting the initial ordering based on the actual performance data.

20. The method of selecting a source of financial information of claim 19, wherein the patient is the guarantor.

* * * * *